(12) United States Patent
Schimschal

(10) Patent No.: US 8,783,962 B2
(45) Date of Patent: Jul. 22, 2014

(54) ROLLING BEARING ARRANGEMENT

(75) Inventor: Herbert Schimschal, Bamberg (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 511 days.

(21) Appl. No.: 12/825,472

(22) Filed: Jun. 29, 2010

(65) Prior Publication Data

US 2010/0329597 A1  Dec. 30, 2010

(30) Foreign Application Priority Data

Jun. 30, 2009  (DE) .......................... 10 2009 031 063

(51) Int. Cl.
*F16C 27/00* (2006.01)
*F16C 43/00* (2006.01)
*F16C 27/04* (2006.01)

(52) U.S. Cl.
USPC ............................ 384/535; 384/542; 384/581

(58) Field of Classification Search
USPC .......... 384/535, 536, 542, 569, 581, 582, 611
See application file for complete search history.

(56) References Cited

U.S. PATENT DOCUMENTS

| | | | |
|---|---|---|---|
| 3,097,022 A * | 7/1963 | Sernetz .......................... | 384/536 |
| 3,447,846 A * | 6/1969 | Marsh ........................... | 384/536 |
| 3,904,008 A * | 9/1975 | Sonnerat ....................... | 192/98 |
| T981,004 I4 * | 4/1979 | McNeely et al. | |
| 4,715,780 A * | 12/1987 | Kan .............................. | 415/200 |
| 5,166,184 A * | 11/1992 | Hashimoto et al. ........... | 521/135 |
| 5,868,503 A * | 2/1999 | Bade ............................. | 384/536 |
| 6,715,925 B2 * | 4/2004 | Pairone et al. ................ | 384/536 |
| 6,863,443 B2 * | 3/2005 | Mahling ....................... | 384/536 |
| 7,223,458 B2 * | 5/2007 | Tango ........................... | 428/131 |
| 2006/0159379 A1 * | 7/2006 | Brandenstein et al. ....... | 384/535 |

FOREIGN PATENT DOCUMENTS

DE     103 31 150       2/2005
DE  10 2007 023 244   11/2008

* cited by examiner

*Primary Examiner* — Alan B Waits
(74) *Attorney, Agent, or Firm* — Simpson & Simpson, PLLC

(57) ABSTRACT

A rolling bearing arrangement with at least one outer bearing ring and at least one inner bearing ring and with rolling bodies guided in raceways between the bearing rings. At least one damping body is provided for mechanical vibration damping. The damping body reduces the vibration transmission to at least one component following in the force flux. At least one damping body is materially bonded to at least one of the bearing rings.

6 Claims, 2 Drawing Sheets

ROLLING BEARING ARRANGEMENT

This application claims the priority of DE 10 2009 031 063.0 filed Jun. 30, 2009, which is incorporated by reference herein.

DESCRIPTION

1. Field of the Invention

The invention relates to a rolling bearing arrangement with at least one outer bearing ring and at least one inner bearing ring and with rolling bodies guided in raceways between said bearing rings, wherein at least one damping body is provided for mechanical vibration damping, said damping body reducing the vibration transmission to at least one component following in the force flux.

2. Background of the Invention

A rolling bearing arrangement of this type is known from DE 103 31 150 B4. A so-called "wire rolling bearing" in the form of a rotary guide with two guide parts is disclosed therein, in which the rolling bodies roll along track rings designed as track wires. The track rings are arranged in elastic cushion rings made of elastomer. In this case, the cushion rings serve to improve the quietness in operation and to reduce the production of noise by the bearing. A disadvantage of this configuration is that the elastic cushion rings made of elastomer material generate a certain spring effect during operation leading to inaccuracies during the movement transmission between the guide parts. In addition, the arrangement of the cushion rings in the bearing is complex.

Furthermore, a so-called "rotary table bearing" with two track ring parts mounted relative to each other via a radial-axial rolling bearing is known from DE 10 2007 023 244 A1, in which, in order to reduce the transmission of component vibrations, which are undesirably produced in the rolling bearing, to the surrounding structure, a squeeze-film damper connected in parallel to the rolling bearing is provided. Said squeeze-film damper damps the component vibrations, which are produced in the rolling bearing, at a damping gap which is filled with a damping fluid, for example oil. Such a configuration of the vibration damping of the rolling bearing is highly complex in terms of structure and manufacturing.

OBJECT OF THE INVENTION

The invention is therefore based on the object of providing a rolling bearing arrangement of the abovementioned type, in which the mechanical vibration transmission to the surrounding structure during operation is reduced, in which at the same time great bearing accuracy is ensured and which can be produced in a simple manner.

SUMMARY OF THE INVENTION

The transmission of structure-borne noise and component vibrations to the surrounding structure can be reduced by placing vibration-damping material into at least one bearing ring. For this purpose, according to the invention, at least one damping body is provided, said damping body being materially bonded to at least one bearing ring. The material bond between the bearing ring and damping body results in the creation of a single-part, stiff unit which avoids a spring effect during the force transmission between said unit and a component following in the force flux and, as a result, ensures high bearing accuracy and at the same time acts in a noise-reducing and component-vibration-damping manner. Such a material bond can take place at the boundary layer between the damping body and bearing ring by means of a bonding or interlocking connection or by a combination of both connections and can be produced in a simple manner. Since the damping takes place directly in the bearing ring itself, an additional outlay on installation and manufacturing for placing damping components into the bearing is avoided. The damping body can form one or more closed, in particular annular regions on the bearing ring. However, it is also conceivable for the damping body to form one or more discrete regions on the bearing ring, in particular for fastening the bearing to the surrounding structure. The damping body may also be designed to be materially bonded to a bearing shell designed as a bearing ring or a bearing housing designed as a bearing ring.

The damping body is composed of vibration-damping material which, when bonded to metal, can be produced in a simple manner, in particular can be cast or injection molded and has a high specific rigidity and strength while having a low weight. When bonded to metal, in particular steel, plastic can be used. In particular, rigid foamed polymers have a high strength and rigidity at a low weight and also have properties which damp structure-borne noise and vibrations. It is also conceivable to use metal foams which have a high specific rigidity and strength and damping properties.

The damping body is preferably constructed in epoxy resin foam. Epoxy resin foam has a high strength, rigidity and thermal stability and also chemical resistance. In addition, a material bond can be produced in a particularly simple manner by foaming epoxy resin on a metallic component, in particular constructed in steel. The low density of the epoxy resin foam in comparison, in particular, to steel results in a reduction in the mass of the bearing ring and reduces the overall weight of the bearing.

In a preferred refinement, the damping body forms a substantially annular damping region of the bearing ring and is materially bonded thereto on or in the bearing ring body in an annularly encircling manner. As a result, the bearing ring can be damped over the entire ring circumference thereof in terms of structure-borne noise and vibrations. If the damping body has a circular-ring-shaped contour, it forms a damping ring region of the bearing ring. It is also conceivable for the damping body to be constructed with a contour differing from the circular-ring-shaped contour, in particular for producing an interlocking connection between said damping body and the bearing ring at the boundary layer of the material bond.

In a further preferred refinement of the invention, the damping body forms at least one intermediate ring region of the bearing ring. In this case, the two radial circumferential sides remote from each other of the damping body are respectively materially bonded to a ring region of the bearing ring and thereby connect two ring regions of the bearing ring to each other. In this case, the damping body, which is integrated into the bearing ring on the intermediate ring region, damps the transmission of structure-borne noise and vibrations to the bearing ring over the entire ring circumference thereof. It is also conceivable for one bearing ring to have a plurality of damping bodies, each integrated in the form of an intermediate ring region.

According to a further particularly preferred embodiment of the invention, a respective damping body forming an intermediate ring region is provided on the inner bearing ring and on the outer bearing ring. By this means, the rolling bearing arrangement can be damped in terms of structure-borne noise and vibrations at an intermediate ring region on the outer bearing ring and on the inner bearing ring, in each case over the entire ring circumference thereof.

In a further variant of the invention, the damping body on the outer bearing ring forms the radially outer, free ring region thereof and/or on the inner bearing ring forms the radially inner, free ring region thereof. In this case, the free ring region can be connected, in particular for the fastening of the bearing ring, to at least one component following in the force flux. The damping body here forms a material bond with a ring region of the bearing ring, which ring region faces the bearing inner space radially. It is also conceivable for at least one damping body forming an intermediate ring region to be provided at the same time on a bearing ring next to a damping body forming a free ring region on the bearing ring.

The damping body preferably forms the radially outer, free ring region of the outer bearing ring and the circumferential side thereof which faces the bearing inner space radially is materially bonded to the track ring region thereof, which forms the raceways for the revolving rolling bodies. As a result, the outer bearing ring comprises a damping ring region radially on the outside and a track ring region radially on the inside.

It is advantageous if the damping body has at least one receptacle on the free ring region for fastening means, for connection to at least one component following in the force flux. In order to produce a screw connection, the receptacle can be constructed, for example, as a blind hole for a threaded insert or as an axial throughbore. In this case, the damping body may also be designed as a fastening flange.

According to a further aspect of the invention, a method for producing a rolling bearing arrangement with at least one damping body provided for mechanical vibration damping is proposed. In order to produce a material bond between at least one damping body and at least one bearing ring of the rolling bearing arrangement, the damping body made of rigid foamed plastic, in particular epoxy resin foam, is foamed and/or cast and/or injection molded on the bearing ring. The damping body can be fitted onto or into the bearing ring, in particular by being foamed on. In this case, the foam wets the part being fitted and builds up an adhesive connection to the latter, in particular to the steel material. By integrating the foaming step into the existing bearing-ring manufacturing process, a bearing ring materially bonded to at least one damping body can be produced simply and cost-effectively in this manner. It is also possible to produce the material bond by casting or injection molding or by a combination of said production processes and the foaming step. By adding suitable hardeners, a thermosetting plastic of high strength, rigidity and thermal stability and chemical resistance is produced from epoxy resin. The lower density of the epoxy resin foam in comparison in particular to steel results in a reduction in the mass of the bearing ring and reduces the overall weight of the bearing.

BRIEF DESCRIPTION OF THE DRAWINGS

Further features of the invention emerge from the description below and from the attached drawings in which a plurality of exemplary embodiments of the invention are illustrated in simplified form. In the drawings.

DETAILED DESCRIPTION OF THE DRAWINGS

Figure 1:
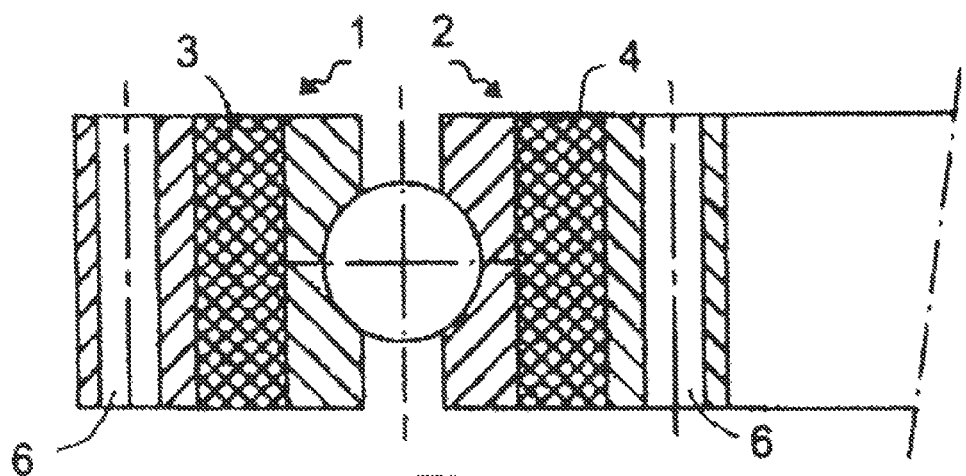
FIG. 1 shows a partial section of a rolling bearing arrangement in a first exemplary embodiment with two damping bodies according to the invention.

FIG. 1 illustrates a rolling bearing arrangement constructed as a four-point bearing, in a partial section. The rolling bodies revolve on raceways between the outer and the inner bearing ring 1, 2. A damping body 3, 4 constructed in epoxy resin foam is respectively integrated on the inner and on the outer bearing ring 1, 2 by material bonding. In this case, a respective damping body 3, 4 is placed in the bearing ring body on the outer bearing ring 1 and on the inner bearing ring 2 as an intermediate ring region between two ring regions, which are constructed in steel, of the bearing ring 1, 2. In this case, the damping bodies 3, 4 each connect the track ring region, which faces the bearing inner space radially and forms the raceways for the revolving rolling bodies, and the free ring region, which faces away radially from the bearing inner space and is radially on the outside of the outer bearing ring 1 and radially on the inside of the inner bearing ring, and are each connected to said ring regions by material bonding. For this purpose, the damping body 3 is foamed and/or cast and/or injection molded on the outer bearing ring 1, on the radially inner circumferential side of the free ring region and on the radially outer circumferential side of the track ring region and, corresponding to the damping bodies 4, on the inner bearing ring 2, on the radially outer circumferential side of the free ring region and on the radially inner circumferential side of the track ring region. In order to fasten the rolling bearing arrangement to at least one component following in the force flux, one or more axial throughbores, which are distributed over the circumference, are provided in each case on the free ring region of the outer and of the inner bearing ring 1, 2 as receptacles 6 for fastening means, for example screws for an axial screw connection. In this case, the rolling bearing arrangement may be configured in particular as a flange-mountable bearing, such as, for example, a rotary table bearing or rotary connection.

Figure 2:
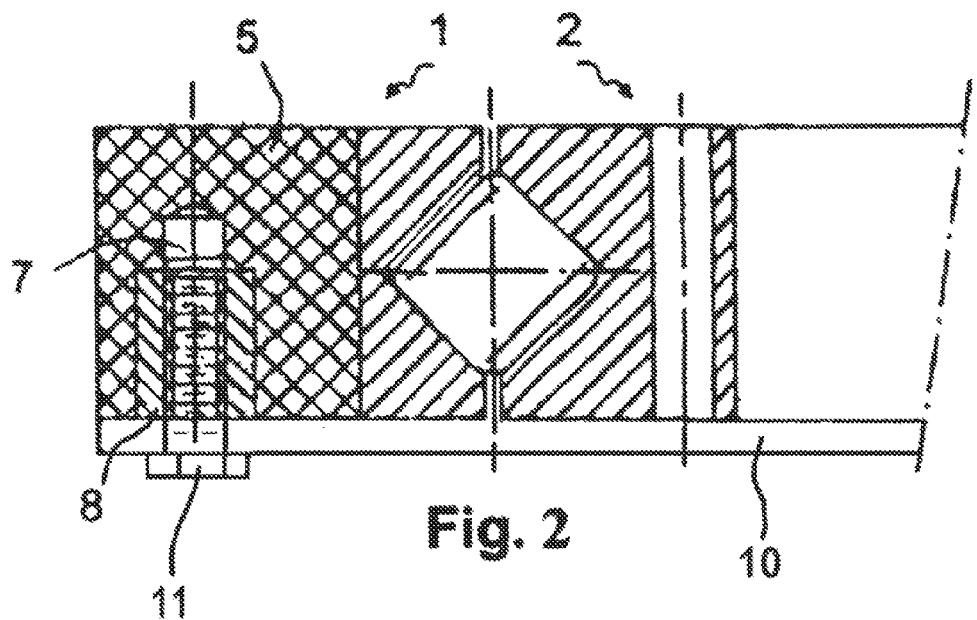
FIG. 2 shows a partial section of a rolling bearing arrangement in a second exemplary embodiment with a damping body according to the invention.
Figure 3:
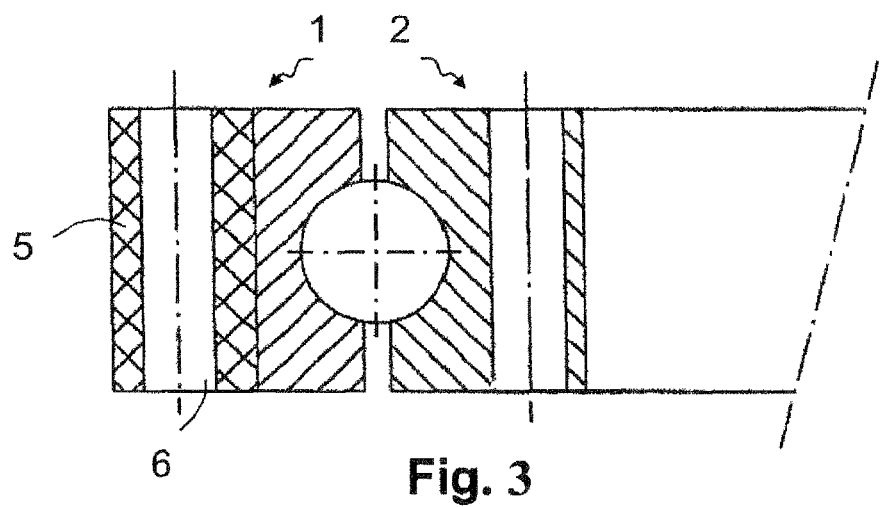
FIG. 3 shows a partial section of a rolling bearing arrangement in a third exemplary embodiment with a damping body according to the invention.

FIGS. 2 and 3 show further partial sections of a rolling bearing arrangement according to the invention in a second and third exemplary embodiment. In said embodiments, a damping body 5 constructed from epoxy resin foam in each case forms the radially outer, free ring region on the outer bearing ring 1 while the inner bearing ring 2 is completely constructed in steel. For this purpose, the damping body 5 is foamed and/or cast and/or injection molded on the radially outer circumferential side of the track ring region constructed in steel and forms a material bond therewith. As a result, the outer track ring 1 consists of a radially outer damping ring region and a radially inner track ring region. The damping ring region is designed as a fastening flange and has a plurality of axial receptacles 6, 7, which are distributed over the circumference, for a screw connection. FIG. 2 illustrates a rolling bearing arrangement which is designed as a cross roller bearing and has damping body 5 which has receptacles 7, which are designed as axial blind holes, for one threaded insert 8 in each case. At least one component 10 following in the force flux is fastened to damping body 5 by a bolt 11 threadably inserted in threaded insert 8. As seen in FIG. 2, receptacles 7 are contiguous with damping body 5, meaning damping body 5 completely encloses receptacle 7 around the wall and blind bottom of receptacle 7. FIG. 3 shows a four-point bearing with a damping body 5, in which one or more receptacles 6, which are distributed over the circumference and are designed as an axial throughbore, are provided.

LIST OF REFERENCE NUMBERS

1 Bearing ring
2 Bearing ring
3 Damping body
4 Damping body
5 Damping body
6 Receptacle
7 Receptacle
8 Threaded insert

The invention claimed is:

1. A rolling bearing arrangement, comprising:
   at least one outer bearing ring;
   at least one inner bearing ring;
   rolling bodies guided in raceways between the outer bearing ring and the inner bearing ring;
   wherein at least one damping body is provided for mechanical vibration damping between the bearing and a component;
   the at least one damping body being a foamed polymer or a metal foam, the at least one damping body materially bonded to at least one of the bearing rings, and the at least one damping body being designed as a fastening flange including a blind hole with a threaded insert, whereby the at least one damping body is connectable to the component via a fastener threaded into the threaded insert; and,
   wherein the blind hole is contiguous with the at least one damping body.

2. The rolling bearing arrangement of claim 1, wherein the damping body forms at least one substantially annular damping region of the at least one of the bearing rings and is materially bonded to the latter in an annularly encircling manner.

3. The rolling bearing arrangement of claim 1, wherein the damping body forms the free ring region of the outer bearing ring.

4. A method for producing a rolling bearing arrangement, comprising: at least one outer bearing ring; at least one inner bearing ring; and rolling bodies guided in raceways between the outer bearing ring and the inner bearing ring, wherein at least one damping body is provided for mechanical vibration, the method comprising:
   foaming the at least one damping body and applying the foamed at least one damping body on at least one of the bearing rings, and
   forming a blind hole in the at least one damping body and inserting a threaded insert into the blind hole, whereby the at least one damping body is connectable to a component;
   wherein the blind hole is contiguous with the at least one damping body.

5. The rolling bearing arrangement of claim 1, wherein the vibration-damping material is epoxy resin foam.

6. The method of claim 4, wherein the at least one damping body is made from an epoxy resin foam.

\* \* \* \* \*